Nov. 26, 1968 J. L. KELLY ETAL 3,413,007

TURNTABLE BEARING STRUCTURE

Filed Jan. 3, 1967 3 Sheets-Sheet 1

INVENTORS
JACK L. KELLY
RONALD K. WIANDT

BY Thomas A. Briody
ATTORNEY

Nov. 26, 1968 J. L. KELLY ETAL 3,413,007

TURNTABLE BEARING STRUCTURE

Filed Jan. 3, 1967 3 Sheets-Sheet 2

INVENTORS
JACK L. KELLY
RONALD K. WIANDT

BY Thomas A. Brody

ATTORNEY

Nov. 26, 1968 J. L. KELLY ETAL 3,413,007

TURNTABLE BEARING STRUCTURE

Filed Jan. 3, 1967 3 Sheets-Sheet 3

INVENTORS
JACK L. KELLY
RONALD K. WIANDT

BY Thomas A. Briody
ATTORNEY

United States Patent Office 3,413,007
Patented Nov. 26, 1968

3,413,007
TURNTABLE BEARING STRUCTURE

Jack L. Kelly and Ronald K. Wiandt, Decatur, Ill., assignors to General Electric Company, a corporation of New York Filed Jan. 3, 1967, Ser. No. 607,031
8 Claims. (Cl. 274—39)

ABSTRACT OF THE DISCLOSURE

A turntable bearing assembly consisting of four cylindrical elements. These elements being a hub, a thrust bearing, a shaft and a support sleeve. The hub is integral with and extends from the underside of the turntable and has a central opening which receives the thrust bearing. The thrust bearing has a central opening for receiving one end of the shaft. The other end of the shaft is fitted within a central opening in the support sleeve. A linear and ring type of bearing contact is provided for by engagement of a radiused peripheral edge of the shaft and the spherical shape of the upper interior wall of the thrust bearing.

This invention relates to improved recording and reproducing devices, and more particularly to an improved turntable bearing arrangement for such devices.

In prior art recording and reproducing devices incorporating a turntable, the bearing arrangements for supporting the turntable have proven either unduly complex or difficult to manufacture in accordance with mass production techniques. Accordingly, it has been found desirable to provide a new and improved turntable bearing system which is very simplified and readily lends itself to high volume production procedures.

An important object of this invention is to provide a new and improved phonograph bearing system which is economical in cost.

Another object of the present invention is to provide a new and improved turntable bearing structure which is simplified and efficient.

A further object of this invention is to provide a new and improved turntable bearing structure which is readily manufacturable.

In carrying out our invention in one form thereof, there is provided a turntable rotatably mounted on a support. To rotatably support this turntable in a new and improved fashion, a generally cup shaped recess is formed on the underside of the turntable at the axis of rotation thereof and a cup shaped thrust bearing is ensconced in the turntable recess. The bearing has a cylindrical vertical wall connected to a generally spherical upper end. In such an arrangement, the turntable shaft includes a smooth cylindrical bearing surface for rotatable horizontal bearing cooperation with the cylindrical vertical wall of the bearing, and the upper end of the shaft has a peripheral edge with a relatively small radius uniformly formed thereon for rotatable vertical bearing cooperation with the spherical upper end of the bearing.

By further aspects of the present invention, additional desirable features may be included in the turntable bearing structure, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings, in which:

Figure 1:
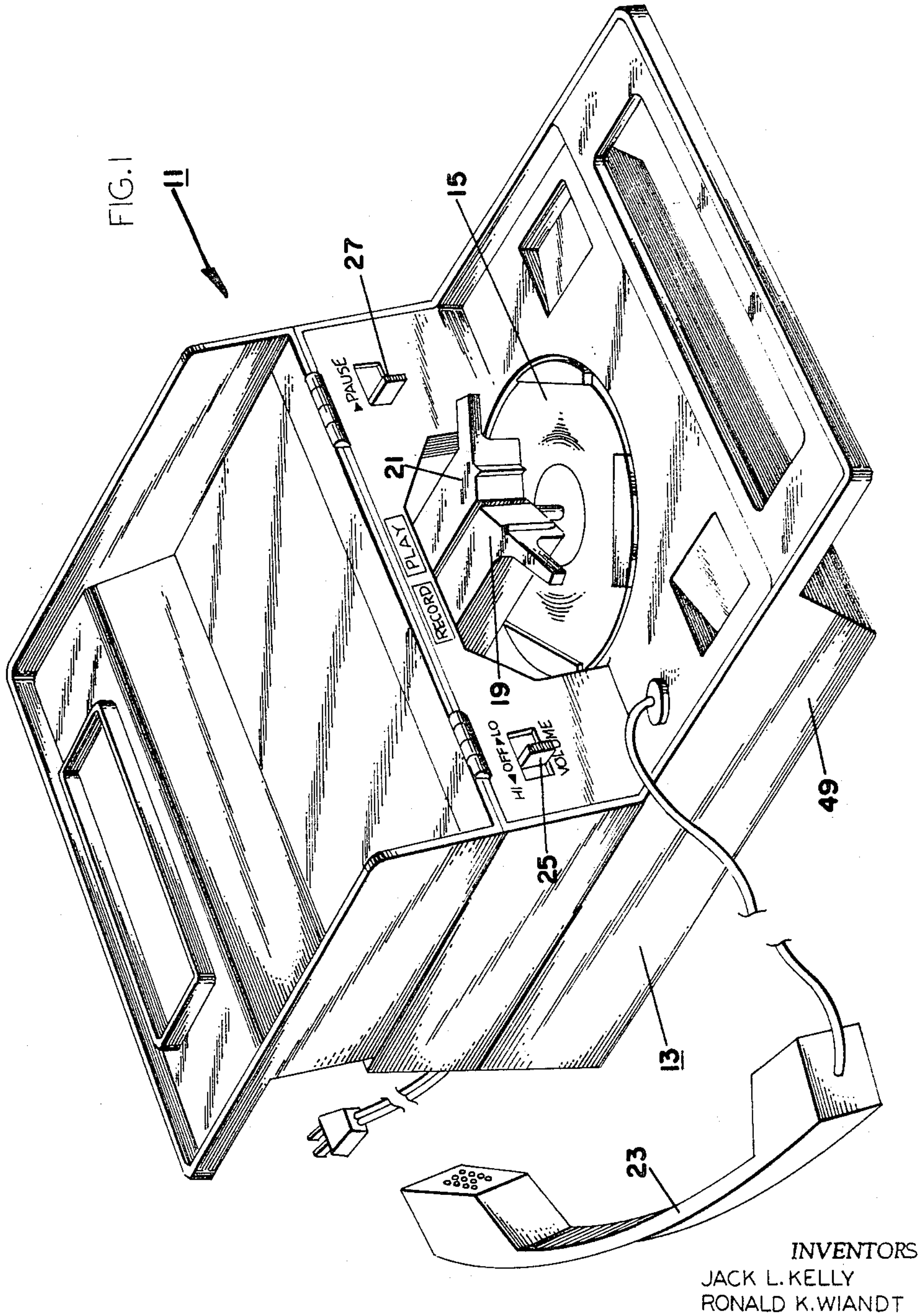
FIGURE 1 is a perspective view of an embossable disc-type recording and reproducing device embodying the present invention, in one form thereof.

Referring in detail to the drawings, and initially in particular to FIGURE 1 thereof, there is shown a disc-type recording and reproducing device 11 embodying one form of our invention. The recording device 11 essentially comprises a three part housing 13 wherein turntable 15 and its driving motor (not shown) are located, recording arm 19 and its associated recording head, playback arm 21 and its associated playback head, an amplifier (not shown) and a combination speaker-microphone type of handset 23. For controlling the device 11 there is also provided an "on-off" and "volume" control knob 25 and a "pause" control knob 27. Knob 27 is thus for selectively coupling and decoupling the driving motor to the turntable 15 for facilitating desired momentary interruption of its movement.

Figures 2, 3, 4:
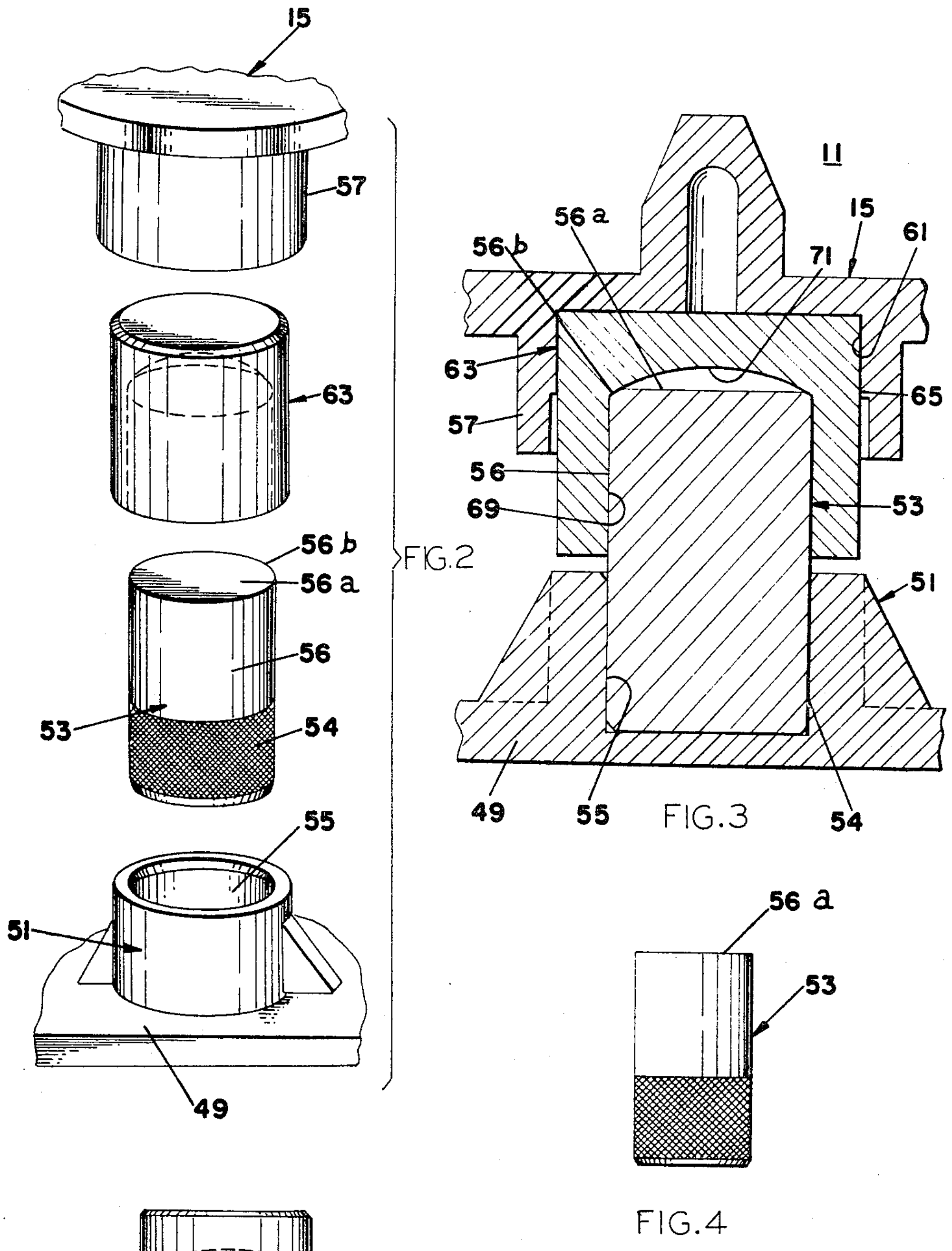
FIGURE 2 is an exploded perspective view showing the turntable bearing arrangement for the device of FIGURE 1.
FIGURE 3 is a sectional view of our turntable bearing arrangement.
FIGURE 4 is an elevation view of the shaft for the turntable bearing arrangement.
Figure 5:
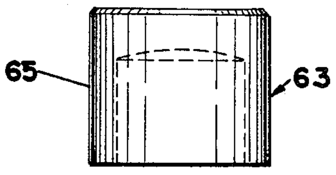
FIGURE 5 is an elevation view of the thrust bearing of our invention.

The improved bearing system which embodies the present invention is set forth in detail in FIGURES 2–6. As shown therein, the bottom housing member 49 of device 11 includes an integral molded sleeve 51 for receiving and supporting the turntable shaft 53. Shaft 53 has a knurled cylindrical bottom portion 54 for press fitted frictional engagement with the inner walls 55 of supporting sleeve 51. Thus, more particularly, as shown in FIG. 3, the inner walls 55 of sleeve 51 are engaged by the periphery of knurled shaft portion 54, and thrust radially outwardly and away from the axis of supporting sleeve 51 so that they exert resilient compressive frictional forces upon the knurled portion 54 of the shaft 53 to secure it firmly to the bottom housing member. The upper protruding portion 56 of shaft 53 extends vertically upwardly as shown in FIG. 2, and it has the same general diameter as the lower knurled portion 54. It should be additionally noted, however, that the upper and outermost end **56*a* of shaft 53 has a peripheral edge 56*b* with a small radius formed thereon. By way of example, the present invention has effectively utilized for a turntable of approximately 4½ inches in diameter, a turntable shaft 53 of chrome plated Ledloy having a knurled portion diameter of 0.403+.002, —.001 inch, an upper portion diameter of 0.4000+.0000 —.0005 inch, a length of .655 inch, and a peripheral radius 56*b* of 0.20±.004 inch. Such a shaft was used in conjunction with a sleeve 51** having a hole depth of .314 inch, and a flat sided internal configuration of .400+.000, —.003 inch across flats.

The bottom of the turntable 15 has integrally molded thereto a cylindrically configured hub 57. Hub 57 is also integrally connected to the flanged peripheral outermost wall of the molded turntable by spokes (not shown).

In accordance with our invention, there is ensconced within the cylindrical recess 61 of turntable hub 57 a cup shaped thrust bearing 63. The bearing 63 is preferably constructed of a suitable low friction bearing material such as Teflon filled with carbon, but understandably may be structured with advantage from other well known bearing materials, such as Nylon or Delrin.

The thrust bearing 63 of the exemplary embodiment of our invention has a cylindrical outer wall 65 which is press fitted into secure engagement with adjacent interior surfaces of the turntable hub 57. However, it should be understood that it is considered within the purview of this invention to alternatively provide a turntable with an integrally associated thrust bearing 63, the turntable being then structured of a suitable material to provide an interior bearing cavity of the nature provided by bearing 63 of the disclosed inventive embodiment.

The interior cavity of bearing 63 includes a cylindrical vertical wall 69 (FIG. 3) connected to a spherical inner end portion 71. For the exemplary shaft dimensions previously set forth, the radius of portion 71 was .380 inch and the internal diameter of wall 69 was 0.4005+.0020, −.0000 inch. As further shown in FIG. 3, the turntable with its depending bearing 63 secured thereto, is placed into cooperative engagement with the smooth cylindrical surface of the upwardly protruding portion 56 of shaft 53. With such an arrangement, the bearing 63 and shaft portion 56 are relatively dimensioned so that the cylindrical vertical surface of shaft 53 is in rotatable bearing engagement with the cylindrical vertical inner wall of the bearing 63, thereby providing a lateral bearing relationship between the turntable 15 and the shaft 53.

The radiused peripheral edge **56*b* of the shaft 53 thereupon tangentially engages the spherical inner end portion 71 of the bearing 63 to provide a linear and ring type of bearing contact between the shaft and turntable. Thus, the dimensional relationship between the curved peripheral edge 56*b* of shaft 53 and its spherical seat 71 in bearing 63 serves to provide a vertical bearing relationship between the shaft 53 and turntable 15 to rotatably journal the turntable 15 on the bottom member 49** of the housing.

With such a bearing arrangement, it will thus be understood that the turntable has been provided with an effective and simplified bearing mechanism that consists of a minimum number of parts and readily lends itself to extremely economical manufacturing techniques.

Figure 6:
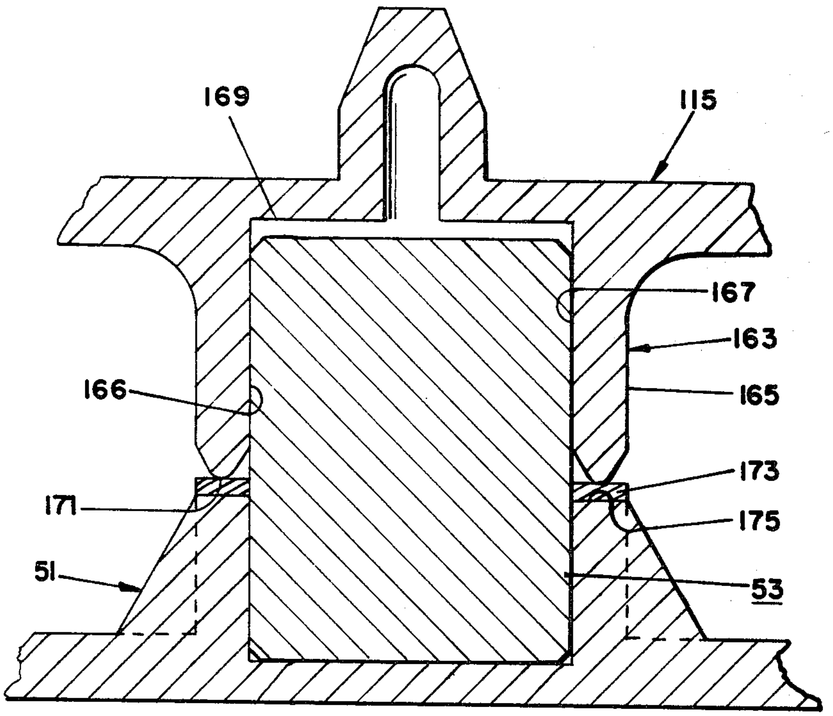
FIGURE 6 is a fragmentary elevation view of an alternate form of the present invention.

FIGURE 6 shows a modified form of the aforesaid bearing arrangement, which is also within the purview of this invention. In this form of our invention, the turntable 115 includes an integrally molded thrust bearing cup 163 having a cylindrical outer wall 165 (depending from the main horizontal surface of the turntable) and an interior cavity 166. The inner cavity 166 of bearing cup 163 provides a cylindrical vertical wall 167 connected to a relatively flat horizontally disposed inner end 169. The bottom annular end 171 of cup 163 is suitably radiused to provide annular and tangential engagement with a polished metal washer 173. Washer 173 is thus positioned on annular upwardly facing shoulder 175 of molded sleeve 51.

As further shown in FIGURE 6, the shaft 53 and sleeve 51 are the same structure as shown for the bearing arrangement of FIGURE 3. Essentially, the bearing arrangement of FIGURE 6 differs from that of FIGURE 3 in that the thrust bearing is integral to the turntable, and vertical bearing is provided by tangential, linear-ring type contact between the bottom annular end 171 of cup 163 and the upwardly facing surface of washer 173. Horizontal bearing cooperation for this modification is the same as for the arrangement of FIGURE 3.

It will now, therefore, be seen that the present invention affords maximum simplicity for rotatably supporting a phonograph turntable via a novel and improved construction.

While in accordance with the patent statutes, we have described what at present are considered to be the preferred embodiments of our invention, it will be obvious to those skilled in the art that various changes and modifications may be made therein without departing from this invention, and therefore, we aim in the following claims to cover all such equivalent variations as fall within the true spirit and scope of this invention.

What we claim as new and desire to secure by Letters Patent of the United States is:

1. For use in a phonograph, a bearing structure for a phonograph turntable, said structure comprising a support, a turntable thrust bearing arranged in concentric relation to said turntable, said bearing having a generally cup shaped configuration with a recess formed therein, said bearing recess including a cylindrical vertical wall, a turntable shaft secured to said support and extending upwardly therefrom, said shaft including a smooth cylindrical bearing surface for rotatable horizontal bearing cooperation with the cylindrical vertical wall of said bearing, and means for facilitating a tangential annular bearing relationship between said thrust bearing and said support thereby to provide a vertical bearing cooperation between said turntable and said support.

2. The bearing structure of claim 1 wherein the means for facilitating a tangential bearing relationship between the thrust bearing and the support is an upwardly facing curved periphery at the upper end of the shaft, said curved periphery providing a linear and ring type vertical bearing cooperation with a spherical seat located at the inner end of the bearing recess.

3. The bearing structure of claim 1 wherein the means for facilitating a tangential bearing relationship between the thrust bearing and the support is a curved peripheral shoulder depending from said bearing, said curved peripheral shoulder providing a linear and ring type vertical bearing cooperation with an annular horizontal surface disposed upon said support.

4. The bearing structure of claim 1 wherein the thrust bearing forms an integral part of said turntable.

5. The bearing structure of claim 1 wherein the bearing is constructed from carbon filled Teflon.

6. A turntable bearing system comprising a support, a turntable, a generally cup-shaped recess formed in the underside of said turntable at the axis of rotation thereof, a cup shaped thrust bearing ensconced in the recess of said turntable, said bearing having a cylindrical vertical wall connected to a spherical inner end, and a turntable shaft secured to said support and extending upwardly therefrom, said shaft including a smooth cylindrical bearing surface for rotatable horizontal bearing cooperation with the cylindrical vertical wall of said bearing, the upper end of said shaft having a curved periphery for providing vertical bearing engagement with the spherical inner end of said bearing, said bearing being constructed of a carbon filled Teflon.

7. The turntable bearing system of claim 6 wherein the bearing is constructed of nylon.

8. The turntable bearing system of claim 6 wherein the bearing is constructed of Delrin.

References Cited

UNITED STATES PATENTS 2,978,281 4/1961 Hayward ---------- 308—227

FOREIGN PATENTS 1,181,442 10/1964 Germany.

LEONARD FORMAN, *Primary Examiner.*

FELIX J. D'AMBROSIO, *Assistant Examiner.*